Patented Oct. 25, 1949

2,485,597

UNITED STATES PATENT OFFICE 2,485,597

ETHYL CELLULOSE GELS

Mortimer T. Harvey, South Orange, N. J., assignor to Harvel Research Corporation, a corporation of New Jersey No Drawing. Application September 7, 1944, Serial No. 553,107

6 Claims. (Cl. 106—174)

This invention relates particularly to ethyl cellulose gels. In the course of my experimentations I have found that gels may be produced with ethyl cellulose and normally liquid unsaturated organic materials. At room temperature these normally liquid unsaturated organic materials when mixed with ethyl cellulose do not to any material degree dissolve the same in a commercially reasonable period of time. These normally liquid unsaturated organic materials are capable only at elevated temperatures of forming a solution with ethyl cellulose in a reasonably short time, which solution, caused by either a dispersion or solution of the ethyl cellulose therein, is a gel when cooled to room temperature (70° F.).

Some of the normally liquid unsaturated organic materials capable at elevated temperatures of forming a solution with ethyl cellulose which solution on cooling is a gel, are the alkyl esters of abietic acid and particularly those having from 1 to 4 carbon atoms in the alkyl group, examples of which are methyl abietate, ethyl abietate, etc.; the liquid condensation reaction products of a terpene, examples of which are turpentine, pinene, dimentene, limonine, cedar wood oil, cedrene, etc. with formaldehyde in the presence of an acidic condensing agent; the liquid condensation reaction products of a terpene alcohol, examples of which are pine oil, terpineol, eucalyptol, etc. with formaldehyde in the presence of an acidic condensing agent; and the normally liquid condensation reaction products of tertiary alkyl alcohols, examples of which are tertiary amyl alcohol, tertiary butyl alcohol, tertiary hexyl alcohol, tertiary heptyl alcohol, tertiary octyl alcohol, etc. with formaldehyde in the presence of an acidic condensing agent.

I have further discovered that novel gels may be produced with ethyl cellulose and the "blown" products of said normally liquid unsaturated organic materials and that for certain purposes these novel gels are far superior to those gels produced with the said normally liquid unsaturated organic materials in the untreated condition. Among some of the advantages of my novel combination are: higher tensile strength, higher dielectric strength, higher dryness characteristic, lower petroleum solvents characteristic and so forth.

The alkyl esters of abietic acid and preferably the alkyl esters of abietic acid having from one to four carbon atoms in the alkyl group represent one genus of a normally liquid unsaturated organic material which is capable at elevated temperatures of forming a solution with ethyl cellulose, which solution upon cooling is a gel at 70° F.

A wide variety of gels may be produced by varying the ratio of the quantity of ester employed to the quantity of the ethyl cellulose employed. For the purposes of illustration, the following is an example of a method for producing a rubbery gel therewith:

Example 1

One hundred parts by weight of methyl abietate, hereinafter referred to as product L, are heated to between 150° C. and 165° C. and twenty five parts of ethyl cellulose are added to said methyl abietate at said temperature and the mass is stirred until solution takes place at said temperature. The solution is then allowed to cool to room temperature and at this temperature of about 70° F. this mass is a gel which may be further characterized as rubbery and resilient. The methyl abietate employed is obtainable on the market and has a specific gravity at 25° C. of 1.025 and a viscosity at 25° C. of 3200 centipoises. Although methyl abietate has been employed in this example, the other alkyl esters of abietic acid and particularly those having from one to four carbon atoms in the alkyl group may be substituted for the methyl abietate and may be of the same quantity by weight to obtain the same type solid rubbery gel.

A second genus of a normally liquid unsaturated organic material capable at elevated temperatures of forming a solution with ethyl cellulose are the liquid organic condensation reaction products produced by reacting a terpene with formaldehyde in the presence of an acidic catalyst.

A commercially practical method for producing this second genus is to react a terpene and formaldehyde in aqueous solution in the presence of an amount of an acid so limited in quantity that the pH of the aqueous phase of the mix is less than that required to cause material polymerization of the terpene. In carrying out this process, between 1 to 7 molecular proportions and preferably between 3 to 7 molecular proportions of formaldehyde are used for each molecular proportion of the terpene. The commercially available aqueous solution of formaldehyde containing approximately 37.5% to 40% formaldehyde is employed. The quantity of acid is preferably very low and for most purposes may be between .01 to .1 mole per mole of terpene.

The following Examples 2 to 7 inclusive illustrate the specific manner of preparing some of said reaction products of this genus and are given for the purposes of illustration.

Example 2

About 150 lbs. of a commercial water solution of formaldehyde (about 37.5% formaldehyde in water), about 100 lbs. of gum turpentine (U. S. Naval Stores) and about 250 cc. of concentrated sulphuric acid were placed together and agitated, the formaldehyde solution and the sulphuric acid being brought carefully together before the turpentine was added. This mixture of turpentine, formaldehyde solution and sulphuric acid was heated to boiling and maintained in the state of boiling under a reflux condenser while being constantly agitated for about 9 hours. At the end of this 9 hour period about 2.25 lbs. of dry caustic soda was added to the resulting mix and agitated therein for about an hour in order to neutralize the sulphuric acid present. The mixture was allowed to stand for about 8 hours after which it was found to have separated into two main layers, (a) an oily or oil-like layer and (b) a watery layer. The oily or oil-like layer was separated from the watery layer and placed in pans in an oven at about 275° F. to vaporize and remove any remaining water and until a practically clear solution of the condensation reaction product may be obtained in a solvent such as ethyl alcohol. This oily or oil-like layer thus finally obtained is hereinafter designated as product A, at 27° C. has a specific gravity of 1.08 and at 25° C. has a viscosity of 6156 centipoises.

Example 3

About 40 lbs. of 37.5% formaldehyde in water solution, about 57 lbs. of pinene and about 120 cc. of concentrated sulphuric acid were mixed together, the formaldehyde solution and sulphuric acid having been carefully brought together before the turpentine was added. This mixture of aqueous formaldehyde solution, turpentine and sulphuric acid was heated to boiling and maintained in this state of boiling under a reflux condenser while being constantly agitated for about 9 hours. At the end of this 9 hour period about .2 of a lb. of dry caustic soda was added thereto and agitated therethrough to neutralize the sulphuric acid. The mixture was allowed to stand for about 8 hours after which it was found to have separated into two main layers, (a) an oily or oil-like layer and (b) a watery layer. The oily or oil-like layer was separated from the watery layer and placed in pans in an oven at 275° F. to remove any remaining water and until a practically clear solution of the same may be obtained in a solvent such as ethyl alcohol. This oily or oil-like product thus finally obtained is hereinafter designated as product B.

Example 4

About 900 grams of aqueous solution of formaldehyde (37.5% formaldehyde in water), were mixed with about 4 cc. of concentrated sulphuric acid. Then to said mixture was added about 544 grams of dipentene. This mixture of formaldehyde solution, sulphuric acid and dipentene was heated to boiling and maintained in this state of boiling under a reflux condenser and while being constantly agitated for about six hours. At the end of this six hour period, about 4.3 grams of dry caustic soda was added to the resulting mix and this mixture was heated to boiling for about one more hour and then allowed to cool to about room temperature whereupon the mixture was two separate layers, (a) an oily or oil-like layer and (b) a watery layer. The oily or oil-like layer was separated from the watery layer and dehydrated as set forth in Examples 2 and 3. The resultant oily or oil-like layer of this example is hereinafter designated as product C, at 32° C. has a specific gravity of 0.971 and at 25° C. has a viscosity of 19 centipoises.

Example 5

About 675 grams of an aqueous solution of formaldehyde containing 37.5% formaldehyde and 3.5 cc. of concentrated sulphuric acid were mixed together and 560 grams of cedar wood oil added thereto. This mixture of formaldehyde solution, sulphuric acid and cedar wood oil was heated to boiling and maintained in this state of boiling under a reflux condenser while being continuously agitated for a period of about 9 hours. Thereafter, 3.6 grams of dry caustic soda were added thereto and admixed therewith to neutralize the sulphuric acid. The mixture was allowed to stand after which it was separated into two main layers, (a) an oily or oil-like layer and (b) a watery layer. The oily or oil-like layer was separated from the watery layer and placed in pans in an oven at 275° F. to remove any remaining water. This oil-like product thus finally obtained is hereinafter designated as product D and has a specific gravity at 25° C. of 0.972 and a viscosity of 43.7 centipoises at 25° C.

Instead of employing an aqueous solution of formaldehyde in the preparation of the reaction condensation products of terpene and formaldehyde, the reaction may be carried out with substantially anhydrous reactants, and even in this instance the quantity of mineral acid catalyst employed is less than that required to cause appreciable polymerization of the terpenes. The following illustrates the manner of preparing some of the reaction products of said second genus under said conditions.

Example 6

A mixture of 462 parts of turpentine, 90 parts of paraformaldehyde, 30 parts of glacial acetic acid and 3.3 parts of concentrated sulphuric acid is heated to boiling and maintained in this state of boiling while being constantly agitated for about 8 hours under a reflux condenser. The resultant mass is neutralized by adding and admixing therewith caustic soda after which salts precipitate out and may be removed by decantation. The liquid may then be distilled to distill off the water, acetic acid, as well as any unreacted formaldehyde and turpentine. The remaining liquid is the organic condensation reaction product, will hereinafter be designated as product E and has at 25° C. a specific gravity of 1.09 and viscosity of 5300 centipoises.

Example 7

A mixture of 350 parts of pinene, 90 parts of paraformaldehyde, 30 parts of glacial acetic acid and 3.3 parts of concentrated sulphuric acid is heated to boiling and maintained in this state while being constantly agitated for about 8 hours under a reflux condenser. The resultant mass is then neutralized by admixing therewith caustic soda after which salts precipitate out and are removed therefrom. The liquid may then be distilled to drive off the water, acetic acid, as well as any unreacted pinene and formaldehyde. The remaining liquid is the organic condensation reaction product, will hereinafter be designated as product F and has at 25° C. a specific gravity of 1.08 and a viscosity of 570 centipoises.

A third genus of a normally liquid unsaturated organic material capable at elevated temperatures of forming a solution with ethyl cellulose are the liquid organic condensation reaction products produced by reacting a terpene alcohol with formaldehyde in the presence of an acidic catalyst.

A commercially practical method for producing this third genus is to react a terpene alcohol and formaldehyde in aqueous solution in the presence of an amount of an acid so limited in quantity that the pH of the aqueous phase of the mix is less than that required to cause appreciable polymerization of the terpene alcohol. In carrying out this process, between 1 and 7 molecular proportions and preferably between 2 and 7 molecular proportions of formaldehyde are used for each molecular proportion of the terpene alcohol. Commercially available aqueous solution of formaldehyde containing 37.5% to 40% formaldehyde is employed. The quantity of acid is preferably very low and for most purposes the mole ratio of the formaldehyde to the acid catalyst in said mixture may be between about 3 to .01 and 1 to .1.

The following Examples 8 to 10 inclusive illustrate the specific manner of preparing some of the reaction products of this genus and are given for the purposes of illustration:

Example 8

About 612 grams of an aqueous solution of formaldehyde containing 37.5% formaldehyde and 3.1 cc. of concentrated sulphuric acid were mixed together and 375 grams of pine oil were added thereto. This mixture of pine oil, sulphuric acid and aqueous formaldehyde was heated to boiling and maintained in this state of boiling under constant agitation and under a reflux condenser for about six hours. Then about 4.3 grams of dry caustic soda was added thereto and admixed therewith to neutralize the sulphuric acid. At room temperature, the mix separated into two main layers, (a) an oily or oil-like layer and (b) a watery layer. The oily or oil-like layer was dehydrated by heating as in Examples 2 and 3 to provide reaction condensation product hereinafter designated as product G and having at 25° C. a specific gravity of 1.065 and a viscosity of 1649 centipoises.

Example 9

About 1000 grams of 37.5% formaldehyde in water solution and 4.5 cc. of concentrated sulphuric acid were mixed together and 616 grams of oil of eucalyptus (product of Guatemala) were added to this mixture. This mixture of formaldehyde solution, sulphuric acid, and oil of eucalyptus was heated to boiling and maintained in this state of boiling under a reflux condenser while being constantly agitated for about 9 hours. Then about 4.8 grams of dry caustic soda were added thereto and mixed therewith in order to neutralize the sulphuric acid. The mix was allowed to stand and separated into two main layers, (a) an oily or oil-like layer and (b) an aqueous layer. The oil-like layer was separated from the watery layer and heated as in Examples 2 and 3 to remove any water therefrom. This condensation reaction product is hereinafter designated as product H and has at 25° C. a specific gravity of 1.005 and a viscosity of 190 centipoises.

Instead of employing an aqueous solution of formaldehyde in the preparation of the reaction condensation products of terpene alcohols and formaldehyde, the reaction may be carried out with substantially anhydrous reactants, and even in this instance the quantity of mineral catalyst employed is less than that required to cause appreciable polymerization of the terpene alcohols. The following illustrates the manner of preparing some of the reaction products of said third genus under said conditions.

Example 10

A mixture of 150 parts of pine oil, 90 parts of formaldehyde, 30 parts of glacial acetic acid and 3.3 parts of concentrated sulphuric acid is heated to boiling while being constantly agitated for about 8 hours under a reflux condenser. The resultant mass is neutralized with caustic soda after which precipitated salts are removed therefrom. The liquid may be distilled to remove water, acetic acid as well as any unreacted formaldehyde and turpentine. The remaining liquid is the organic condensation reaction product hereinafter designated as product I and having at 25° C. a specific gravity of 1.09 and a viscosity of 356 centipoises.

Still another genus of a normally liquid unsaturated organic material capable at elevated temperatures of forming a solution with ethyl cellulose are the liquid organic condensation reaction products produced by reacting a tertiary alkyl alcohol with formaldehyde in the presence of an acidic catalyst.

A commercially practical method for producing this last described genus is to react a tertiary alcohol and formaldehyde in the presence of an acidic catalyst. In carrying out this process, between 1 to 8 molecular proportions and preferably between 3 to .8 molecular proportions of formaldehyde are used for each molecular proportion of the tertiary alkyl alcohol. The commercially available aqueous solution of formaldehyde containing approximately 37.5% to 40% formaldehyde is employed. The quantity of acid is preferably very low and is preferably between about .01 mole to .1 mole per mole of tertiary alkyl alcohol.

The following Examples 11 to 13 inclusive illustrate the specific manner of preparing some of the reaction products of this genus and are given for the purposes of illustration.

Example 11

About 306 grams of tertiary hexyl alcohol, which in this example is diethyl methyl carbinol with a boiling point of 123° C. was mixed with 720 grams of aqueous formaldehyde solution (37.5%) and 1.5 cc. of sulphuric acid concentrated. This mixture was heated in an autoclave to 100 lbs. per square inch pressure and held there for about one hour. The mixture was cooled to room temperature and no odor of formaldehyde remained. It was then neutralized with dilute sodium hydroxide and separated into two layers, an oily layer and a watery layer. The oily layer which separated out had a specific gravity of about 0.992. The oily layer was distilled at a temperature above 135° C. to remove water and any volatile constituents. The liquid residue was soluble in alcohol and benzene but insoluble in water and distilled at atmospheric pressure as follows:

| Percent distilled | 10 | 20 | 30 | 40 | 50 | 60 | 70 | 80 | 90 |
|---|---|---|---|---|---|---|---|---|---|
| °C | 175 | 194 | 210 | 225 | 242 | 253 | 263 | 280 | 300 |

Example 12

About 225 grams of a 40% aqueous solution of formaldehyde was mixed with about 74 grams of tertiary butyl alcohol and 10 grams of hydrochloric acid. This mixture was heated to boiling and maintained in this state of boiling under a reflux condenser for about six hours. After neutralizing the reaction mixture with dilute sodium hydroxide, an upper oily layer was separated from the watery layer and distilled to volatilize any liquids boiling below 135° C. Fractions of this product hereinafter designated as product J had boiling points above 135° C. and as high as 280° C. and specific gravities greater than 1.

Example 13

About 720 grams of aqueous formaldehyde solution (37.5% formaldehyde) is mixed with 264 grams of tertiary amyl alcohol and 1.3 cc. of concentrated sulphuric acid. The mixture was placed in an autoclave and heated until the gauge indicated a pressure of 100 lbs. per square inch. The pressure tended to rise rapidly at this point indicating an exothermic action. Application of heat was stopped until the reaction subsided and pressure commenced to drop. Heat was then reapplied and so regulated as to maintain the pressure at 100 lbs. per square inch for one hour. The mixture was cooled and when the autoclave was opened, it was found that the odor of formaldehyde had disappeared. The contents had separated into two layers. Dilute sodium hydroxide was added until the aqueous layer was neutral and then the oily layer was separated therefrom. The oily layer was then distilled by heating to a temperature of about 135° C. to distill off water and other volatile products which may have been contained therein. The residual oil which weighed about 370 grams had a specific gravity at 25° C. of 1.075 and a viscosity of 130 centipoises at 25° C. and is hereinafter designated as product K.

Throughout this description and claims, the term "formaldehyde" is employed to include formaldehyde as well as paraformaldehyde which is formaldehyde in the polymerized state.

Each of the normally liquid unsaturated organic substances, of which products A-L are examples, capable at elevated temperatures of dissolving ethyl cellulose and of forming a gel therewith upon cooling of said solution, are treated to produce said "blown" products. These "blown" products may be produced by agitating one or a mixture of two or more of said normally liquid unsaturated organic substances maintained at an elevated temperature and in the presence of a free oxygen containing gas, and the agitation is continued until the viscosity at 25° C. of the substance being treated is at least 50% and preferably at least 100% greater than the viscosity at 25° C. of the untreated substance and the combined oxygen content of the treated substance is greater and preferably at least 0.5% greater than the combined oxygen content of the untreated substance. In addition to these characteristics, the specific gravity of the treated substance is higher than the specific gravity of the untreated substance, the treated substance has a lower solubility in mineral spirits when compared with the corresponding characteristic of the untreated substance.

In carrying out this process in the production of said "blown" products I prefer to employ heat so that the temperature of the normally liquid unsaturated organic substance subjected to said free oxygen containing gas be at least 140° F. and although temperatures greatly in excess of 140° F. may be employed, I prefer to employ a temperature range of between about 140° F. and 400° F. notwithstanding that temperatures in excess of 400° F. such as 600° F. may be employed. While a wide variety of gases containing free oxygen may be employed, for the purposes of illustration I disclose the use of air, oxygen or ozone, the former being most preferable because of its availability and low cost. The agitation of said substance may be accomplished by flowing said substance, by projecting said substance or by forcing the gas itself through the substance being treated. These methods may be practiced at atmospheric pressure or super atmospheric pressures.

The following is an illustrative general example of a method for increasing the viscosity and combined oxygen content of said normally liquid unsaturated organic substances capable at elevated temperatures of forming a solution with ethyl cellulose, which solution upon cooling is a gel.

Example 14

A quantity of one of said unsaturated organic liquids, such as any one of the specific products A-L, is placed into a closed container having a conduit extending through the top thereof and terminating at a point spaced from but near the bottom thereof. The lower end of said conduit has a plurality of lateral openings therethrough, through which air, oxygen or ozone may be discharged and into said unsaturated organic liquid at places below the upper surfaces of said liquid. The container has a vent located near the top thereof to release air, used to prevent too great pressure being built up in said container and to allow the air, oxygen or ozone to circulate through said liquid. A stirrer is employed to constantly agitate said liquid throughout the entire operation thereby to increase the contact of the liquid with the air, oxygen or ozone. Throughout the entire operation, the liquid is maintained at a temperature between about 160° F. and 300° F. while the air, oxygen or ozone, admitted to said container may be at room temperature. The quantity of liquid in the container may be about one-quarter of the capacity thereof in order to accommodate the great deal of splashing due to the bubbling of the air, oxygen or ozone therethrough and the agitation due to stirring. After a period of between about 24 to 144 hours, depending upon the rate of stirring, the rate of air, oxygen or ozone admission and the quantity of said liquid, said liquid will be found to have increased in specific gravity, viscosity and combined oxygen content when compared with the respective corresponding characteristics before said operation was begun. The combined oxygen content will have increased at least 1% and in some cases will have increased as high as about 19% or more. The viscosity at 25° C. will have increased at least 100% and in some cases will have increased to such a degree that it has been converted to a mass which is semi-solid at 25° C.

Example 15

After products A, D, G and H were heated to a temperature of about 90° C. and air blown for a period of 24 hours while being maintained at said elevated temperature, the resulting respective products, hereinafter designated AO, DO, GO and HO had the following specific gravities and viscosities:

| Products | Specific Gravity at °C. | Viscosity in Centipoises at 25° C. |
| --- | --- | --- |
| AO | 1.109/29 | 20,650 |
| DO | 1.077/27 | semisolid |
| GO | 1.075/25 | 4,458 |
| HO | 1.045/26 | 400 |

Example 16

After product C was heated to a temperature of about 90° C. and air blown for a period of 72 hours while being maintained at said elevated temperature, the resulting product hereinafter designated as CO had at 25° C. a specific gravity of 0.988 and at 25° C. a viscosity of 60 centipoises.

Example 17

After products E, F and I are heated to an elevated temperature of about 90° C. and air blown for a period of about 6 hours while being maintained at said elevated temperature, the resulting respective products, hereinafter designated as EO, FO and IO will all have been converted to a semi-solid state and all will have increased in combined oxygen content by more than 1%. Products EO will be found to have had a high percentage increase in combined content which is over 19%.

Example 18

After product J is heated to an elevated temperature of about 90° C. and air blown for a period of 24 hours while being maintained at said elevated temperature the resulting product, hereinafter designated as JO will have become converted from a liquid to a semi-solid and its combined oxygen content will have been increased by more than 2%.

Example 19

After product K is heated to an elevated temperature of 90° C. and air blown for a period of about 30 hours while being maintained at said elevated temperature, the resulting product hereinafter designated as KO will have at 25° C. a viscosity of 600 centipoises and will have more than 1% increase in combined oxygen content.

Example 20

A specific example of some of my novel products may be obtained by employing methyl abietate at a temperature of about 300° F. to 310° F. and allowing the methyl abietate maintained at this temperature to flow or cascade over a series of angularly disposed plates or pans with air being moved over the flowing abietate in a counter current direction. The following table shows the characteristics of the products produced at different intervals of this particular blowing operation.

| Product | No. of hrs. at 305° F.¹ | Viscosity at 25° C. | Viscosity at 25° C. Thinned with 25% Xylol | Spec. Grav. | Solubility in mineral spirits to cloudiness in grams | Index of Refraction |
|---|---|---|---|---|---|---|
|  |  |  | Cp. |  |  |  |
|  | 0 | 2,500 cp | 40 | 1.03 | 20 to 1 | 1.528 |
| P | 10 | 5,300 cp | 50 | 1.035 | 8 to 1 | 1.530 |
| Q | 20 | 21,000 cp | 60 | 1.04 | 4 to 1 | 1.531 |
| R | 30 | too thick | 70 | 1.045 | 3 to 1 | 1.5325 |
| S | 40 | ___do___ | 80 | 1.05 | 2.3 to 1 | 1.5335 |
| T | 50 | very heavy | 104 | 1.06 | 1.8 to 1 | 1.535 |

¹ Methyl ester allowed to flow over series of pans in countercurrent flow.

The product produced at the end of this 50 hour treatment has a combined oxygen content of more than 3% greater than the corresponding characteristic of the methyl abietate.

Example 21

1000 parts of ethyl ester of abietic acid was placed in an autoclave. Oxygen was forced into said autoclave and the temperature of the ester was increased to 140° F. with the pressure within the autoclave maintained at about 30 to 40 lbs. per square inch by virtue of the addition of the oxygen under pressure. This mass was stirred rapidly for 24 hours while at said temperature and pressure. The specific gravity at 25° C. of the resulting product increased to 1.08 and its viscosity at 25° C. was more than 100% above that of the original ester. This product is hereinafter known as product U.

Example 22

1000 grams of methyl ester of abietic acid was heated to 180° F. and maintained at this temperature in a closed vessel for 24 hours. During the entire period air was blown into said ester and the ester was stirred very rapidly. At the end of said 24 hour period, the finished product was approximately the same weight as the original material, was almost a semi-solid in consistency and had a specific gravity at 25° C. of about 1.09. This product is hereinafter known as product V.

Example 23

1000 grams of the propyl ester of abietic acid was heated to 180° F. and maintained at this temperature in a closed vessel for 24 hours. During this entire period air was blown into said ester and the ester was stirred very rapidly. At the end of said 24 hour period, the finished product was approximately the same weight as the original material, was almost a semi-solid in consistency and had a specific gravity at 25° C. of about 1.05. This product is hereinafter known as product W.

Example 24

1000 grams of the butyl ester of abietic acid was heated to 180° F. and maintained at this temperature in a closed vessel for 24 hours. During this entire period air was blown into said ester and the ester was stirred very rapidly. At the end of said 24 hour period, the finished product was approximately the same weight as the original material, was almost a semi-solid in consistency and has a specific gravity at 25° C. of about 1.05. This product is hereinafter known as product X.

These "blown" products, so produced and examples of which are set forth in Examples 14 to 24, besides having greater oxygen content, higher specific gravity and viscosity than the untreated substances, when further compared therewith have enhanced solubility characteristics for ethyl cellulose and are more readily dissolved by solid rubbery polymers of chloroprene, butadiene, solid rubbery copolymers of butadiene and styrene and butadiene and acrylonitrile and by natural and reclaimed rubber with all of which they act as enhanced plasticizers.

According to this invention, improved gels are obtained by employing ethyl cellulose and preferably ethyl cellulose in the finely powdered condition and having an ethoxy content of between 44% and 50%. Together with the ethyl cellulose is employed one or more of said blown products heretofore described and obtainable by the methods hereinbefore set forth. Accordingly, the novel compositions of this invention comprise ethyl cellulose and one or more of the blown products of a normally liquid unsaturated organic substance capable at elevated temperatures of forming a solution with ethyl cellulose which solution upon cooling is a gel at room temperature. These "blown" products are obtained by heating above about 140° F. and preferably between 140° F. and 400° F. a mass of said normally liquid unsaturated organic substance and while in said heated condition agitating said mass in the presence of a free oxygen containing gas until the viscosity of said mass at 25° C. has increased at least 50% and preferably at least 100%. The ratio of the ethyl cellulose to said "blown" product may vary over wide limits depending on the type of gel desired. Generally the stiffness or rigidity of the gel may be controlled by varying this ratio and the stiffness and the rigidity characteristics are directly related to this ratio, that is, the higher this ratio the stiffer and more rigid the gel. Thus very rigid and stiff gels as well as soft and pliant gels may be produced. These novel compositions either with or without other substances added thereto may be produced by the following general process:

There is provided in a vessel a quantity of ethyl cellulose and a quantity of one of said products. This mixture is heated preferably between about 250° F. and 400° F. until the mixture is converted to a solution caused by the dispersal or solution of the ethyl cellulose in said product. Then the solution is allowed to cool in shallow pans at room temperature when it is in the state of a gel. The ratio of ethyl cellulose to the "blown" product in said mass may be between about 1 to 2 and 1 to 25 by weight and preferably between 1 to 2 and 1 to 8 by weight.

The various novel compositions thus obtained may be employed for a number of different purposes, among which are: (a) as adhesives, (b) as a coating and/or impregnating material for paper, fabric, wood, metal and the like, (c) for extruded products, (d) calendered stock finding particular application as a substitute covering material such as shoe leather and the like, (e) in printing inks, (f) as a varnish type base, (g) in combination with a rubbery copolymer known as "Buna S" and being a copolymer of butadiene and styrene, (h) in combination with a rubbery copolymer known as "Buna N" and being a rubbery copolymer of butadiene and acrylonitrile, and (i) in combination with natural or reclaimed rubber.

The following are specific illustrative examples of specific gels which may be produced as well as the specific methods which may be employed for the production of these gels. These examples are included herein merely by way of illustration and not by way of limitation.

*Example 25*

About 100 parts of JO are mixed with about 25 parts of ethyl cellulose. This mixture is heated in order to raise the temperature thereof to between about 140° C. and 165° C. and is maintained at this temperature and is constantly stirred or agitated to provide a solution thereof. Then the solution is allowed to cool to room temperature, 70° F. and at said temperature is a rubbery mass and is a gel.

*Example 26*

About 2 parts of AO are mixed with about 1 part of ethyl cellulose. This mixture is heated to raise the temperature of the mix to between about 290° F. and 320 F. and is maintained at this temperature and is constantly stirred or agitated to provide a solution thereof. Then the solution is allowed to cool to room temperature, 70° F. and at this temperature is a gel and is a rubbery mass and issued April 8, 1947 as United States Patent 2,418,583.

*Example 27*

About 3 parts of IO are mixed with about 1 part of ethyl cellulose. The mixture is heated to between about 290° F. and 320° F. and is maintained at this temperature while being constantly stirred to provide a solution thereof. Then the solution is allowed to cool and at room temperature, 70° F., is a gel and a rubbery mass.

*Example 28*

About 3 parts of FO are mixed with about 1 part of ethyl cellulose. This mixture of FO and ethyl cellulose is heated to a temperature of between 290° F. to about 320° F. while being stirred to provide a solution thereof. Then the solution is allowed to cool to room temperature, 70° F. and is a gel and a rubbery mass.

*Example 29*

About 25 parts of EO are mixed with about 1 part of ethyl cellulose. This mixture is heated to between about 290° F. and 320° F. and maintained at this temperature while being constantly stirred to provide a solution thereof. Then the solution is allowed to cool to room temperature, 70° F. and at said temperature is a rubbery mass and is a gel.

*Example 30*

About 4 parts of KO are mixed with about 1 part of ethyl cellulose. This mixture is heated to between about 290° F. to 320° F. and maintained at this temperature while being constantly agitated to provide a solution thereof. Then the solution is allowed to cool to room temperature, 70° F. and at said temperature is a rubbery mass and a gel.

*Example 31*

Three parts of product P and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product P. Then this solution is poured into shallow iron pans about 3" deep and allowed to cool overnight at room temperature (70° F.). The next morning the mass at 70° F. in said pans will be a solid rubbery mass or gel.

*Example 32*

Four parts of product Q and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product Q. Then this solution is poured into shallow iron pans about 3" deep and allowed to cool overnight at room temperature (70° F.). The next morning the mass at 70° F. in said pans will be a solid rubbery mass or gel.

Example 33

Five parts of product R and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product R. Then this solution is poured into shallow iron pans about 3" deep and allowed to cool overnight at room temperature (70° F.) The next morning the mass at 70° F. in said pans will be a solid rubbery mass or gel.

Example 34

Six parts of product S and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product S. Then this solution is poured into shallow iron pans about 3" deep and allowed to cool overnight at room temperature (70° F.). The next morning the mass at 70° F. in said pans will be a solid rubbery mass or gel.

Example 35

Seven parts of product T and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product T. Then this solution is poured into shallow iron pans about 3" deep and allowed to cool overnight at room temperature (70° F.). The next morning the mass at 70° F. in said pans will be a solid rubbery mass or gel.

Example 36

Ten parts of product T and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product T. Then this solution is poured into shallow iron pans about 3" deep and allowed to cool overnight at room temperature (70° F.) The next morning the mass at 70° F. in said pans will be a solid rubbery mass or gel.

Example 37

Four parts of product U and one part of ethyl cellulose (ethoxy content between 44% and 50%) are mixed together in a vessel and heated between about 300° F. to about 325° F. and maintained at said temperature for about 3 to 4 hours or until the ethyl cellulose becomes dissolved or dispersed in product U. Then this solution is poured into shallow iron pans about 3" deep and allowed to cool overnight at room temperature (70° F.). The next morning the mass at 70° F. in said pans will be a solid rubbery mass or gel.

Novel and improved millable compositions and cured compositions are provided by employing the combination of (a) a rubbery substance selected from the group consisting of solid, rubbery polymers of chlorbutadiene, solid rubbery polymers of butadiene, solid rubbery copolymers of butadiene and styrene, solid rubbery copolymers of butadiene and acrylonitrile, natural rubber and reclaimed rubber and (b) a gel comprising ethyl cellulose and a blown product of a normally liquid unsaturated organic substance capable at elevated temperatures of forming a solution with said ethyl cellulose, which solution upon cooling is a gel at 70° F. and which blown product is capable at elevated temperatures of forming a solution with ethyl cellulose which solution upon cooling is a gel at 70° F. Other materials may be employed in said combination, and some of them are carbon blacks, vulcanization agents and accelerators and an antioxidant. The relative quantity of said novel gel to the quantity of said rubbery substance in said combination may vary over comparatively wide limits, and is preferably such that the ratio of the quantity of said rubbery substance by weight to the quantity by weight of the resin in said gel is between about 50 to 1 and 2 to 1. Millable compositions having improved tear resistance properties may be produced by mixing a quantity of (a) together with a quantity of (b) on a rubber mill. The following general example is illustrative of this phase of the invention.

Example 38

A quantity of a rubbery substance of the aforesaid (a) class was gradually added to a quantity of a gel of the aforesaid (b) class while the latter was being masticated on a differential speed roll mill, the rolls of which were maintained at a temperature approximately about 120° F. Milling is continued until there is an intimate and substantially uniform admixture of these substances. Then this intimate mixture may be stripped off the rolls as sheets and cured. If desired, a quantity of a vulcanizing agent, accelerator and reinforcing materials as well as other material used in the compounding or rubber may be added to said mixture and dispersed therethrough on said rubber mill. This product is then sheeted and cured in the usual manner.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention. Particularly it is to be understood that in said claims, ingredients or components recited in the singular are intended to include compatible mixtures of said ingredients wherever the sense permits.

This application is a continuation in part of my copending applications Serial Nos. 481,461, filed April 1, 1943, now abandoned; 522,156, filed February 12, 1944, Patent 2,435,831, and 551,446, filed August 26, 1944, Patent 2,418,583.

Having thus described my invention, what I claim and desire to protect by Letters Patent is:

1. An ethyl cellulose gel comprising ethyl cellulose and a blown product of a normally liquid unsaturated organic material capable at elevated temperatures of forming a solution with ethyl celulose which solution on cooling is a gel at 70° F., said product being capable at elevated temperatures of forming a solution with ethyl cellulose which solution is a gel at 70° F. the viscosity of said product at 25° C. being at least 100% greater than the viscosity of said normally liquid material at 25° C., said normally liquid product being an organic condensation reaction product under acidic conditions of formaldehyde and a product selected from the group consisting of terpenes and terpene alcohols, the ratio by weight of said ethyl cellulose to said blown product being between 1 to 2 and 1 to 25.

2. An ethyl cellulose gel comprising ethyl cellulose and a blown product of a normally liquid unsaturated organic material capable at elevated temperatures of forming a solution with ethyl cellulose which solution on cooling is a gel at 70° F., said product being capable at elevated temperatures of forming a solution with ethyl cellulose which solution is a gel at 70° F. the viscosity of said product at 25° C. being at least 100% greater than the viscosity of said normally liquid material at 25° C., said normally liquid product being an organic condensation reaction product under acidic conditions of a terpene and formaldehyde, the ratio by weight of said ethyl cellulose to said blown product being between 1 to 2 and 1 to 25.

3. An ethyl cellulose gel comprising ethyl cellulose and a blown product of a normally liquid unsaturated organic material capable at elevated temperatures of forming a solution with ethyl cellulose which solution on cooling is a gel at 70° F., said product being capable at elevated temperatures of forming a solution with ethyl cellulose which solution is a gel at 70° F., the viscosity of said product at 25° C. being at least 100% greater than the viscosity of said normally liquid material at 25° C., said normally liquid product being an organic condensation reaction product under acidic conditions of a terpene alcohol and formaldehyde, the ratio by weight of said ethyl cellulose to said blown product being between 1 to 2 and 1 to 25.

4. An ethyl cellulose gel comprising ethyl cellulose and a blown product of a normally liquid unsaturated organic material capable at elevated temperatures of forming a solution with ethyl cellulose which solution on cooling is a gel at 70° F., said product being capable at elevated temperatures of forming a solution with ethyl cellulose which solution is a gel at 70° F. the viscosity of said product at 25° C. being at least 100% greater than the viscosity of said normally liquid material at 25° C., said normally liquid product being an organic condensation reaction product under acidic conditions of turpentine and formaldehyde, the ratio by weight of said ethyl cellulose to said blown product being between 1 to 2 and 1 to 25.

5. An ethyl cellulose gel comprising ethyl cellulose and a blown product of a normally liquid unsaturated organic material capable at elevated temperatures of forming a solution with ethyl cellulose which solution on cooling is a gel at 70° F., said product being capable at elevated temperatures of forming a solution with ethyl cellulose which solution is a gel at 70° F. the viscosity of said product at 25° C. being at least 100% greater than the viscosity of said normally liquid material at 25° C., said normally liquid product being an organic condensation reaction product under acidic conditions of pinene and formaldehyde, the ratio by weight of said ethyl cellulose to said blown product being between 1 to 2 and 1 to 25.

6. An ethyl cellulose gel comprising ethyl cellulose and a blown product of a normally liquid unsaturated organic material capable at elevated temperatures of forming a solution with ethyl cellulose which solution on cooling is a gel at 70° F., said product being capable at elevated temperatures of forming a solution with ethyl cellulose which solution is a gel at 70° F. the viscosity of said product at 25° C. being at least 100% greater than the viscosity of said normally liquid material at 25° C., said normally liquid product being an organic condensation reaction product under acidic conditions of pine oil and formaldehyde, the ratio by weight of said ethyl cellulose to said blown product being between 1 to 2 and 1 to 25.

MORTIMER T. HARVEY.

REFERENCES CITED

The following references are of record in the file of this patent:

UNITED STATES PATENTS

| Number | Name | Date |
|---|---|---|
| 1,902,684 | Asser | Mar. 21, 1933 |
| 2,338,802 | Decker | Jan. 11, 1944 |

OTHER REFERENCES

"Ethyl Cellulose," Hercules Powder Co., Wilmington, Del., (1940), page 16.